United States Patent [19]

Arimatsu

[11] Patent Number: 4,589,072
[45] Date of Patent: May 13, 1986

[54] APPARATUS FOR AUTOMATICALLY MEASURING AND CONTROLLING CHEMICAL REACTION AMOUNT

[75] Inventor: Toshio Arimatsu, Akashi, Japan

[73] Assignee: Sumitomo Rubber Industries, Ltd., Hyogo, Japan

[21] Appl. No.: 706,317

[22] Filed: Feb. 27, 1985

Related U.S. Application Data

[63] Continuation-in-part of Ser. No. 402,893, Jul. 29, 1982, abandoned.

[30] Foreign Application Priority Data

| Aug. 5, 1981 | [JP] | Japan | 56-123462 |
| Nov. 6, 1981 | [JP] | Japan | 56-178488 |
| Nov. 6, 1981 | [JP] | Japan | 56-178489 |
| Nov. 6, 1981 | [JP] | Japan | 56-178490 |
| Nov. 6, 1981 | [JP] | Japan | 56-178491 |

[51] Int. Cl.$^4$ .......................... B01J 19/00; B29H 5/24; G05D 21/02
[52] U.S. Cl. .................... 364/473; 364/476; 364/500; 374/53; 264/40.1; 264/40.6; 425/29; 425/30
[58] Field of Search ............. 364/473, 476, 500; 374/53, 102; 264/40.1, 40.6, 326; 425/29, 30, 144

[56] References Cited

U.S. PATENT DOCUMENTS

| 3,649,729 | 3/1972 | Davis et al. | 374/53 X |
| 3,819,915 | 6/1974 | Smith | 364/473 |
| 3,980,743 | 9/1976 | Smith | 364/473 X |
| 4,022,555 | 5/1977 | Smith | 364/473 X |
| 4,044,600 | 8/1977 | Claxton et al. | 364/473 X |
| 4,344,142 | 8/1982 | Diehr et al. | 364/473 |
| 4,371,483 | 2/1983 | Mattson | 425/29 |

Primary Examiner—Jerry Smith
Assistant Examiner—Allen MacDonald
Attorney, Agent, or Firm—Birch, Stewart, Kolasch & Birch

[57] ABSTRACT

This invention is directed to a reaction amount measurement apparatus capable of measuring the reaction amount and also to a reaction amount measurement and controlling apparatus capable of measuring and controlling the reaction amount with high accuracy. The apparatus comprises at least one temperature detector disposed in the interior, the outer surface of the reaction system or in a vessel, a computer having an operation function for calculating the reaction amount in accordance with the temperature signal of the temperature detectors, and a comparison function for generating an output signal to terminate reaction when the reaction amount has exceeded the set amount, a timer for getting the operation and comparison performed at given intervals.

14 Claims, 14 Drawing Figures

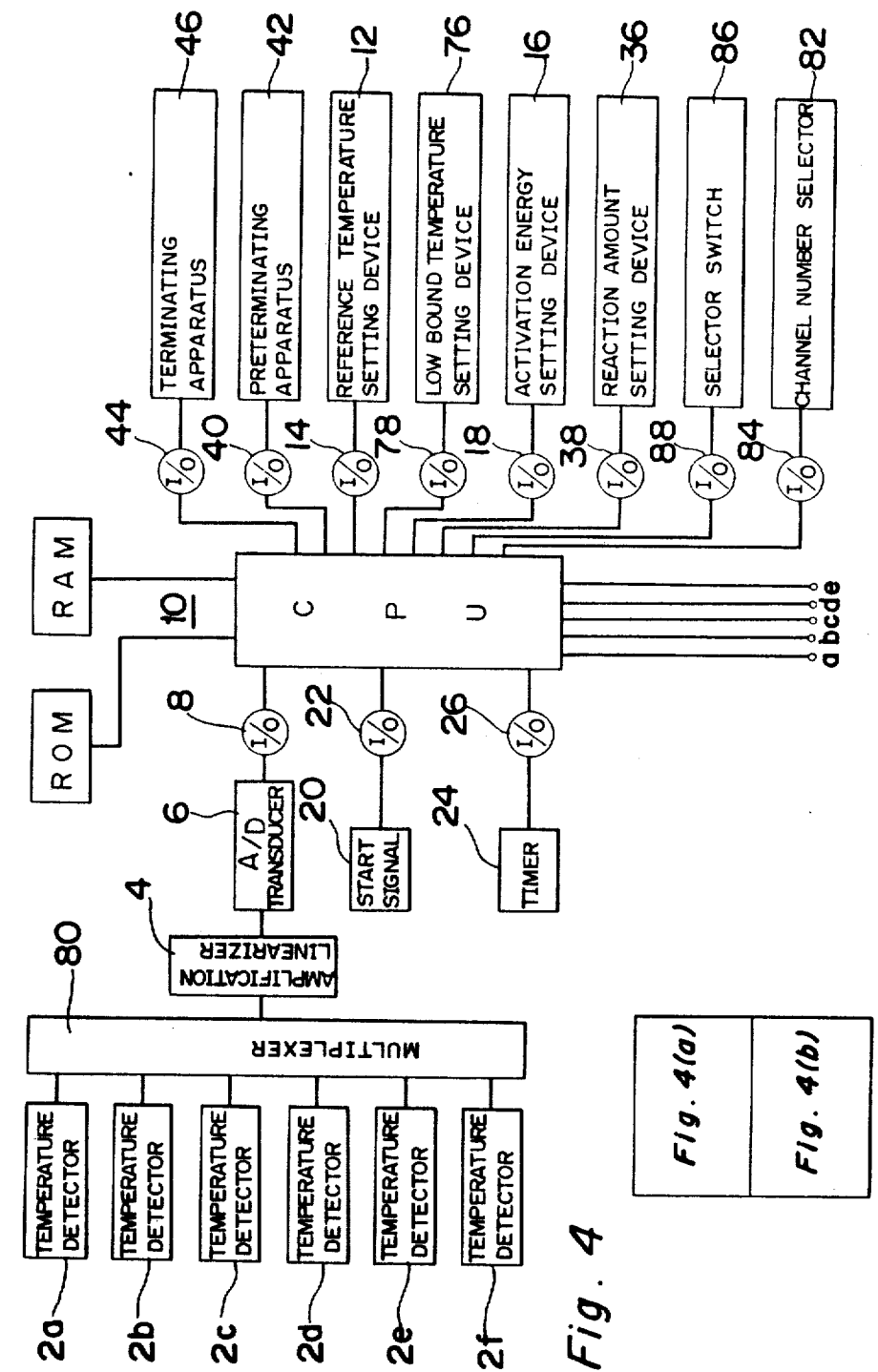

APPARATUS FOR AUTOMATICALLY MEASURING AND CONTROLLING CHEMICAL REACTION AMOUNT

CROSS REFERENCE TO THE RELATED APPLICATION

This is a continuation-in-part application of Ser. No. 402,893, filed July 29, 1982 now abandoned.

BACKGROUND OF THE INVENTION

1. Field of the Invention

The present invention relates to an apparatus for automatically measuring the chemical reaction amount and also to an apparatus for automatically measuring and controlling the chemical reaction amount with respect to the subject materials such as the reaction amount of a rubber vulcanization reaction or high molecular material hardening reaction or the like.

2. Description of the Prior Art

Generally it is extremely important in the chemical industry to control chemical reaction processes for the subject materials to improve reaction efficiency, product quality and yield ratio thereof. Thus, the present applicant developed a reaction amount measurement apparatus, which is capable of easily measuring the reaction amount in an operation field on the assumption of controlling the reaction process as disclosed in Japanese Patent Application Nos. 22025/1979 and 162126/1980. In general, according to the Arrhenius reaction speed equation in the chemical reaction with respect to the subject materials, the ratio of the reaction amount, after t time in the temperature T in the reaction system, with respect to the reference reaction amount per unit time in the reference temperature To, i.e., the relative reaction amount (equivalence reaction amount) for the subject materials, is calculated by a microcomputer in accordance with the following equation (1) or equation (2) as its approximation equation so that the time lapse variation in the temperature measurement and the reaction amount can be read at first sight.

$$U = \int_0^t e^{-\frac{E}{R}(\frac{1}{T} - \frac{1}{To})} dt \quad (1)$$

$$U = \int_0^t \alpha^{\frac{T-To}{10}} dt \quad (2)$$

wherein
U: equivalence reaction amount
E: active energy
R: gas constant
T: temperature
To: reference temperature
$\alpha$: temperature coefficient
t: time Actually the calculation by the above-described equation (1) or equation (2) is performed at constant time intervals in accordance with the temperature T obtained by the temperature signal from the temperature detector provided in the reaction system, and the predetermined E, R, To, $\alpha$.

The reaction amount could be immediately obtained easily in the operation field by this reaction amount measuring apparatus. However, the reaction amount could not be automatically controlled in accordance with the measured value by this reaction amount measuring apparatus.

SUMMARY OF THE INVENTION

An object of the present invention is to provide a reaction amount measurement apparatus which is capable of measuring the reaction amount and also to provide a reaction amount measurement and controlling apparatus which is capable of measuring and controlling the reaction amount with high accuracy and at a higher operating efficiency.

Another object of the present invention is to provide a reaction amount measurement and controlling apparatus wherein the reaction amount for each given interval is detected in accordance with a temperature signal from one temperature detector disposed in the interior or at the outer surface of a reaction system in a vessel or container, and each of the reaction amounts is compared with a predetermined established reaction amount to generate the output signal when the reaction amount has conformed to the established reaction amount or has exceeded the established reaction amount.

A further object of the present invention is to provide a reaction amount measurement and controlling apparatus which comprises one temperature detector disposed in the interior, or at the outer surface of the reaction system in a vessel or container, a computer having an operation function for calculating the reation amount in accordance with the temperature signal of the temperature detector, and a comparison function for generating an output signal when the reaction amount has been conformed to a predetermined set amount or has exceeded the set amount, and a timer for getting the operation and comparison performed at given intervals.

Still another object of the present invention is to provide a reaction amount measurement and controlling apparatus wherein the mathematical average of a plurality of calculated reaction amounts is compared with the preset reaction amount in such a manner that the minimum value or maximum value from amoung a plurality of reaction amounts is compared with the established reaction amount, whereby insufficient reaction is removed, the quality for the uniform reaction is improved, and a reaction critical point where an article is gelled is easily found.

Yet still a further object of the present invention is to provide a reaction amount measurement and controlling apparatus wherein a lower bound temperature signal established in a low bound temperature setting device is compared with a digital temperature setting signal every time the reaction amount is calculated, and when the digital temperature signal is smaller than the low bound temperature signal, the reaction amount at this time is assumed as zero, thereby to render and remove the error of the calculated equivalence reaction amount.

Another further object of the present invention is to provide a reaction amount measurement and controlling apparatus, which is preferably applied to measure and control the chemical reaction amount of a rubber vulcanization reaction with high accuracy.

BRIEF DESCRIPTION OF THE DRAWINGS

These and other objects, features, aspects and advantages of the present invention will become more apparent from the following detailed description of the present invention when taken in conjunction with the accompanying drawings, in which:

FIGS. 4, 4A and 4B are a block diagram, in a second embodiment of the present invention, showing an arrangement of a reaction amount measuring controlling apparatus;

DETAILED DESCRIPTION OF THE INVENTION

It is to be noted that the description for embodiments of the present invention will be proceeded hereinafter in connection with, for example, the vulcanization reaction of rubber to be performed within a metal mold which is adapted to close or open in a known manner.

Figure 1:
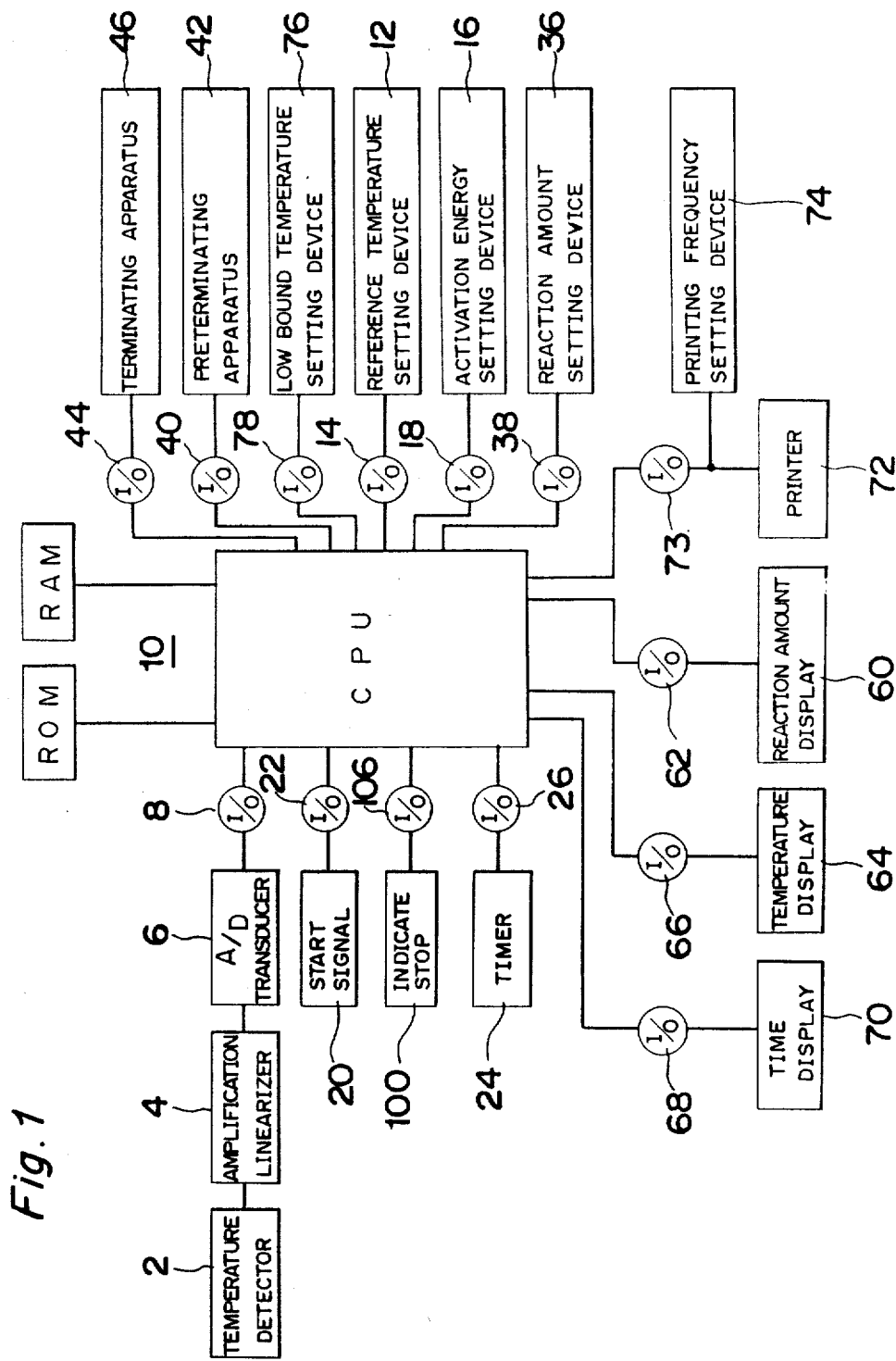
FIG. 1 is a block diagram, in a first embodiment of the present invention, showing an arrangement of a reaction amount measurement controlling apparatus.
Figure 2:
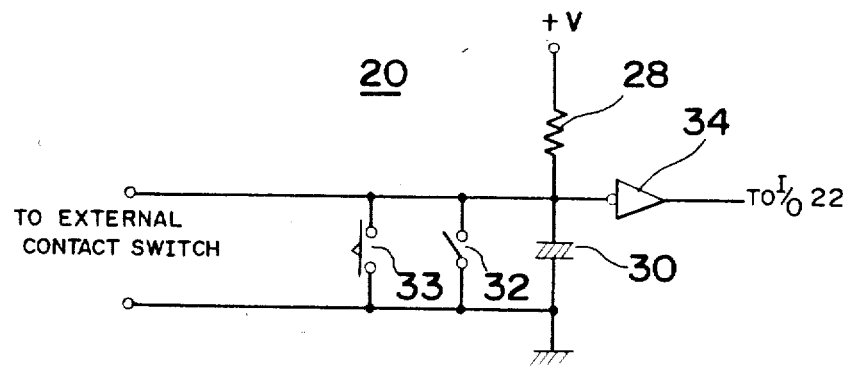
FIG. 2 is a circuit diagram of a starting operation for use in the first embodiment.
Figure 3:
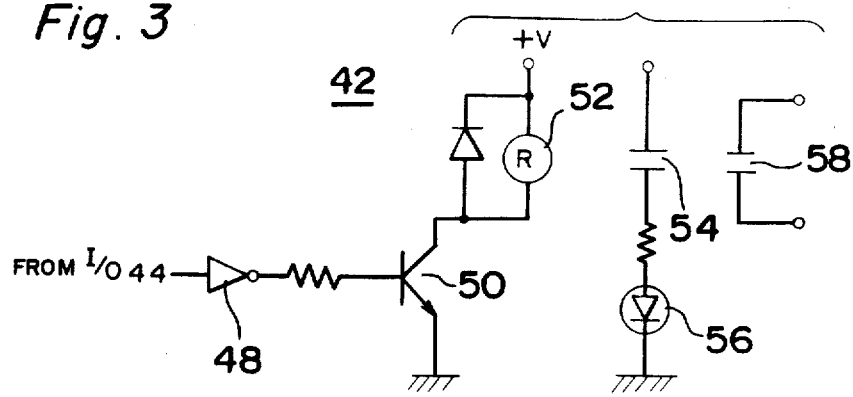
FIG. 3 is a circuit diagram of a preterminating apparatus for use in the first embodiment.

FIG. 1 through FIG. 3 show a first embodiment of an apparatus for automatically measuring and controlling chemical reaction amounts in accordance with the present invention.

Referring to FIG. 1, a temperature detector 2, such as a thermoelectric couple, is inserted into the portion of a reaction system such as the interior of the shoulder portion of a vulcanizing tire or is brought into contact against the outer surface of the shoulder portion or the interior of the reaction vessel or container such as a metal mold in a known manner. The temperature detector 2 may generate a temperature signal corresponding to the temperature at the insertion or contact position with respect to the subject materials. The temperature signal from the temperature detector 2 is fed to an amplification linearizer 4, where it is amplified and rectilinearized. Thereafter, it is converted into a digital temperature signal by an A/D transducer 6 and is fed through an input-output unit 8 to a microcomputer 10.

In addition to the digital temperature signal, a reference temperature $T_o$ which is preset by an operator in a reference temperature setting device 12, is also fed through an input-output unit 14 to the microcomputer 10. In addition, an active energy E, which is set in an activation energy setting device 16, is also fed through an input-output unit 18.

The microcomputer 10 is programmed to operative equivalence reaction amount by an Arrhenius' equation (1) or its approximation equation (2) as mentioned above with the use of digital temperature signal, the reference temperature $T_o$, the activation energy E at the moment every time a command signal, which is generated, by a timer 24, at each of given time intervals, is fed through an input-output unit 26 after a start signal generated by a start signal generator 20 has been fed through an input-output unit 22 to the microcomputer 10. As the start signal generator 20 is used such one as shown in FIG. 2. The start signal generator 20 of FIG. 2 is adapted to generate a start signal through the inversion of the voltage variation, by an inverter 34, to appear between both ends of a capacitor 30 caused through discharging of the electric charge charged in the capacitor 30 through a resistor 28 by a push-button 32 or a limit switch 33, which is adapted to close at the same time when a metal mold accommodated with a rubber tire to be vulcanized has been closed, or by a pulse signal generator for generating the pulse signal at the same time when the metal mold has been closed. Once the start signal is fed during the reaction amount calculation by depression of the push-button switch, the microcomputer 10 is programmed to erase all the data so far measured up to the moment to start the temperature measurement and the calculation newly from the beginning.

The microcomputer 10 is programmed to perform the comparison, as the equivalence reaction amount is calculated, among the reaction amount in, for example, 90% vulcanization of rubber supplied through the input-output unit 38 established in the reaction amount setting device 36, the reaction amount in 100% vulcanization, and each of the calculated equivalence reaction amount so as to feed an output signal to a preterminating apparatus 42 through an input-output unit 40 when it has conformed to the reaction amount in the 90% vulcanization or has been larger than the reaction amount, and to a terminating apparatus 46 through an input-output unit 44 when it has been conformed to the reaction amount in the 100% vulcanization or has been larger than the reaction amount. The preterminating apparatus 42 is adapted to open the metal mold earlier in advance in the case of the reaction amount where the reaction of the subject materials is considerably proceeded even after the metal mold has been opened as in, for example, the tire.

The preterminating apparatus 42 is constructed as shown in FIG. 3. In FIG. 3, an output signal fed from the input-output unit 40 is inverted by an inverter 48. The transistor 50 is conducted by the inversion output to operate a relay 52 to close a contact 54 to light a light-emitting diode 56 and to close a contact 58 to open the metal mold. Also, the output signal may be fed to a pulse generating apparatus (not shown) to generate pulses for use in the other apparatus. It is to be noted that an operator may open the metal mold with a free hand after the light-emitting diode has been lit. The terminating apparatus 46, as similar to in the preterminating apparatus 42, is adapted to light the light-emitting diode to generate the contact signal or to generate the impulse. Accordingly, in the case such as rubber vulcanization reaction, the contact 58 of the preterminating apparatus 42 is closed by the condition of the 90% vulcanization to automatically or manually open the metal mold. If the rubber is taken out from the metal mold at lighting of the light-emitting diode of the terminating apparatus 46 by the condition of the 100% vulcanization, the reaction amount can be controlled extremely correctly.

Figure 5:
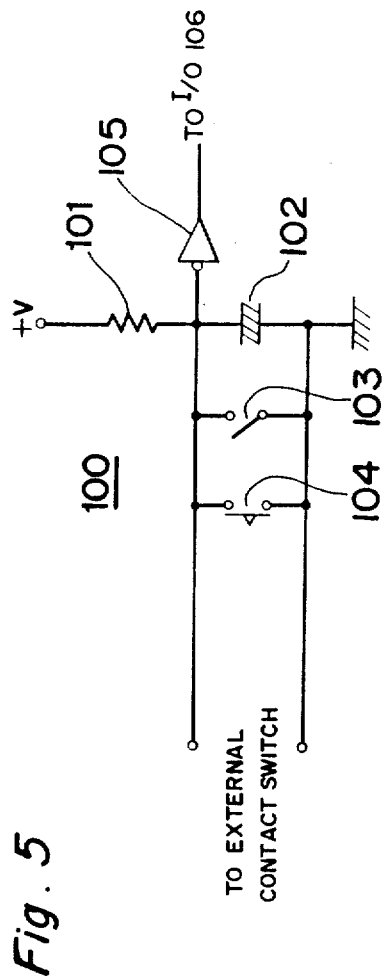
FIG. 5 is a circuit diagram of a display stopping apparatus for use in the first embodiment.

The microcomputer 10 is programmed so that a reaction amount signal is fed through an input-output unit 62 to a reaction amount display 60, each time the reaction amount is calculated, to display the reaction amount. A digital temperature signal at that time is fed through an input-output unit 66 to the temperature display 64, each time the reaction is calculated, to display the temperature. Furthermore, a signal representing the lapse of the time from the reaction start is fed through an input-output unit 68 to a time display 70 to display the time from the reaction start. It is to be noted that the microcomputer 10 is also programmed so that the display may be stopped by the display stop apparatus 100. As shown in FIG. 5, the display stop apparatus 100 is adapted to close a manual switch 103, and a limit switch 104, which is adapted to close when the metal mold opens, to discharge the electric charge to be held in a capacitor 102. Also, a pulse signal generator (not shown) for generating pulse signals when the metal mold opens, is adapted to discharge the electric charge charged by a capacitor 102 through a resistor 101. Change in the voltage across the capacitor 102 caused thereby is inverted by an inverter 105 and is fed to the microcomputer 10 through the input-output unit 106. Even if the display is stopped by the display stop apparatus 100, the microcomputer 10 is performing the operation for calculating continuously the reaction amount, and, when the manual switch 103 and the limit switch 104 have been opened, or when the pulse from the pulse signal generator has stopped, it is needless to say that the present reaction amount calculated within the microcomputer 10 is displayed. Also, the reaction amount and the measured temperature are adapted to be printed, through an input-output unit 73, even on the printer 72. Generally, as the temperature measurement and the calculation are performed more frequently, the accuracy of controlling the reaction amount becomes higher, closing to the predetermined value. The data to be outputted to the printer 72 are not required to be outputted as much as the temperature measurement frequency and the calculation frequency of the reaction amount. Assume that the frequency, which has been set in a printing frequency setting 74 is, for example, "2", and one data is adapted to be printed every time the reaction quantity is calculated twice. It is to be noted that the printing is performed every time "1" is set.

Also, a lower bound temperature signal, which is set in a lower bound temperature setting device 76, is fed through an input-output unit 78 to the microcomputer 10. The microcomputer 10 is adapted to compare a digital temperature signal with a lower bound temperature signal every time the reaction amount is calculated. When the digital temperature signal is lower than the lower bound temperature signal, the microcomputer is programmed so that the reaction amount at this time point is 0, namely, the reaction amount is not calculated. For instance, it is well known that in the case of large bulk reaction amount as in the tire, longer time is taken to raise the temperature of the tire and the low temperature condition for the tire is kept long. According to the calculation of the equivalence reaction amount by the Arrhenius equation (1) or its approximation equation (2), the equivalence reaction amount is small in the case of the relatively low temperature, but the error between the actual amount and the expected amount becomes considerably larger in the case of the long reaction time due to the cumulative total of the time. To remove the error, the reaction amount at that time is assumed to become 0 when the digital temperature signal is lower than the low bound temperature signal.

As clearly mentioned above, the apparatus of the first embodiment comprises at least one temperature detector disposed in the interior, the outer surface of the reaction system or in a container, a computer having an operation function for calculating the reaction amount in accordance with the temperature signal of the temperature detector, and a comparison function for generating an output signal when the reaction amount has been conformed to a predetermined set amount or has exceeded the set amount, a timer for getting the operation and comparison functions performed at given intervals. The apparatus is adapted to perform the steps of detecting the reaction amount for each given interval in accordance with a temperature signal from one temperature detector disposed in the interior or the outer surface of a reaction system, or in a container, and comparing each of the reaction amounts with predetermined established reaction amount to generate the output signal when the reaction amount has conformed to the established reaction amount or has exceeded the established reaction amount, thereby to render to obtain an effect capable of measuring the reaction amount with high accuracy and controlling the reaction amount.

Figure 4B:
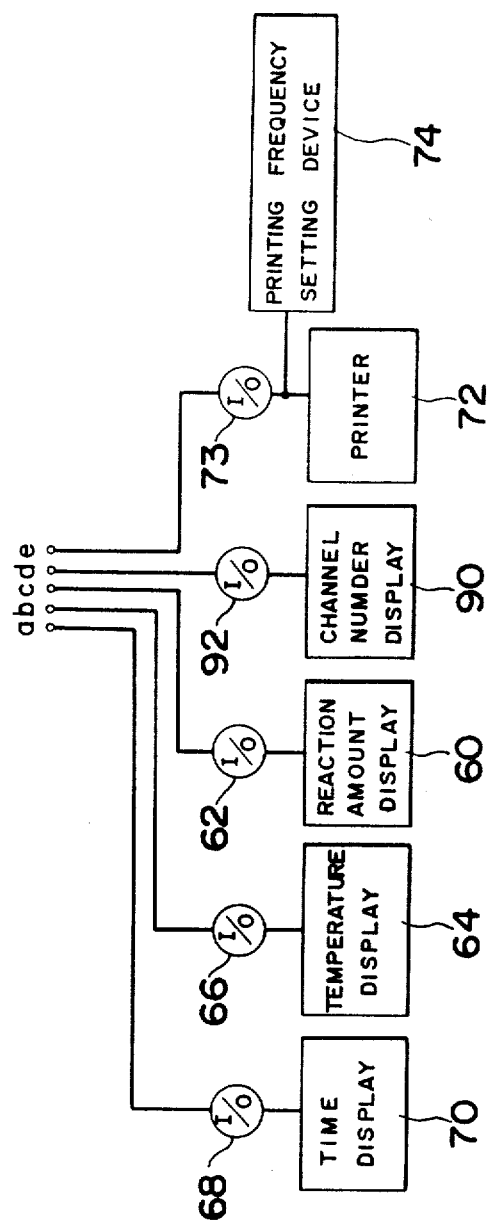

FIG. 4 is a block diagram of a second embodiment of an apparatus according to the present invention. In a first embodiment, the temperature detector 2 is one, but in a second embodiment, a plurality of, for example, six temperature detectors $2a$ through $2f$ are provided within a reaction system. The temperature detectors $2a$ through $2f$ are different from each other in that they are inserted into the interiors of the respective different positions, for instance, along the peripheral direction of the shoulder portion of the vulcanizing tire or they are kept in contact against the interior of a metal mold corresponding to the different position. Each of the temperature signals from the temperature detectors $2a$ through $2f$ are rectilinearized and amplified in order by an amplifier linearizer 4 through a multiplexer 80. Thereafter, it is converted into a digital temperature signal by an A/D transducer 6 and is fed to the microcomputer 10 through an input-output unit 8. It is to be noted that the microcomputer 10 is programmed to load it every time a digital temperature signal is fed, when corresponds to the temperature signal of the temperature detectors such as $2a$, $2c$, $2e$ selected by a channel number selector signal which is fed through an input-output unit 84 from the channel number selector switch 82, thereby to calculate the equivalence reaction amount of the positions where the temperature detectors $2a$, $2c$, $2e$ are provided in accordance with a digital temperature signal, reference temperature signal and an active energy signal. The combinations of temperature detectors $2a$ through $2f$ are $[(2^6-1)=63]$ in number. Also, this calculation for the equivalence reaction amount is performed after the start signal has already generated and when the timer 24 is transmitting a command signal.

Also, the microcomputer 10 is programmed so that the arithmetic average of each of the equivalence reaction amounts of positions where temperature detectors such as temperature detectors $2a$, $2c$, $2e$ selected by a channel number selector 82 are provided may be obtained, or the maximum and the minimum among the respective equivalence reaction amount or the reaction amount of the specified channel may be selected. The obtainment of the arithmetic averages or the selection of the maximum or the minimum to the equivalence reaction amount or the reaction amount is determined by a selector signal fed to the microcomputer 10 through an input-output unit 88 from the selector switch 86.

The microcomputer 10 is programmed so that an output signal is fed to a preterminating apparatus 42 when it has been conformed to the reaction amount in the 90% vulcanization or has been larger than the reaction amount, and to a terminating apparatus 46 when it has been conformed to the reaction amount in the 100% vulcanization or has been larger than the reaction amount, through comparison of the arithmetic average value, the maximum value, minimum value or the reaction amount at a measurement point selected by a selector switch 86 with the set value of the reaction amount setting device 36 as in the first embodiment. The others are the same in construction as in the first embodiment except that a channel number display 90 is adapted to display a sensor selected by a channel number selector 82 and an input-output unit 92 is provided for the channel number display.

With the above construction, it is to be noted that the reaction amount measurement controlling apparatuses of the present invention calculate the reaction amount each time a given time has elapsed and compares the calculated reaction amount with the preset reaction amount in displaying and printing the reaction amount, the reaction with respect to the subject material can be automatically controlled, thus resulting in higher operating efficiency for the reaction amount. Particularly in a second embodiment, the arithmetic average of a plurality of calculated reaction amount can be compared with the preset reaction amount. Thus, as compared with a case where the reaction amount is one as described in the first embodiment, the accuracy of the reaction amount becomes higher, so that the reaction control such as vulcanization accuracy is improved in the second embodiment. In the second embodiment, as the minimum value from among a plurality of reaction amounts can be compared with the established reaction amount insufficient reaction is removed and the quality is improved, thus resulting in the uniform reaction. Also, as the maximum value from among a plurality of reaction amounts can be compared with the established reaction amount, a reaction critical point where an article is gelled can be easily found, thus improving the reaction accuracy.

In addition, the reaction amount measurement controlling apparatuses of the present invention compare a lower bound temperature signal established in a low bound temperature setting device 76 with a digital temperature setting signal every time the reaction amount is calculated. When the digital temperature signal is smaller than the low bound temperature signal, the reaction amount at this time is assumed as 0 to remove the error as described in the first embodiment. Namely, when the digital temperature signal is relative smaller, the equivalence reaction amount calculated by an Arrhenius' reaction speed equation (1) or its approximation equation (2) becomes an extremely small value. However, when the reaction time t is long due to accumulation through time, the calculated equivalence reaction amount contains considerable error. To remove the error, the reaction amount is assumed to be 0 when the digital temperature signal is lower than the low bound temperature signal. Accordingly, as the reaction amount can be calculated with high accuracy, the controlling accuracy of the reaction amount is improved.

Also, as a start signal generating apparatus 20 is provided in both described embodiments, the measurement, calculation and controlling can be automatically started when the vulcanizing press is closed. By the closure of the push-button switch 32 of the start signal generating apparatus 20, all the data so far measured can be erased so that the temperature measurement, calculation and controlling can be newly started. In both embodiments, a printing frequency setting device 74 is provided, and the measured temperature, the reaction amount are printed for each established frequency among the measurement, the calculation performed. In the above-described embodiments, a thermoelectric couple was used as a sensor, while platinum resistor or the like can be used in place of the thermoelectric couple.

Although the present invention has been fully described in connection with the preferred embodiments thereof with reference to the accompanying drawings, it is to be noted that various changes and modifications are apparent to those skilled in the art. By way of example, the concept of the present invention can be applicable not only to the apparatus for automatically measuring and controlling chemical reaction amount such as described, but also any other type of apparatuses as shown in FIGS. 6 and 7, wherein certain components such as a terminating apparatus, preterminating apparatus, and reaction amount setting apparatus can be eliminated from the apparatuses of FIGS. 1 and 4, respectively, if necessary to operate.

Figure 6:
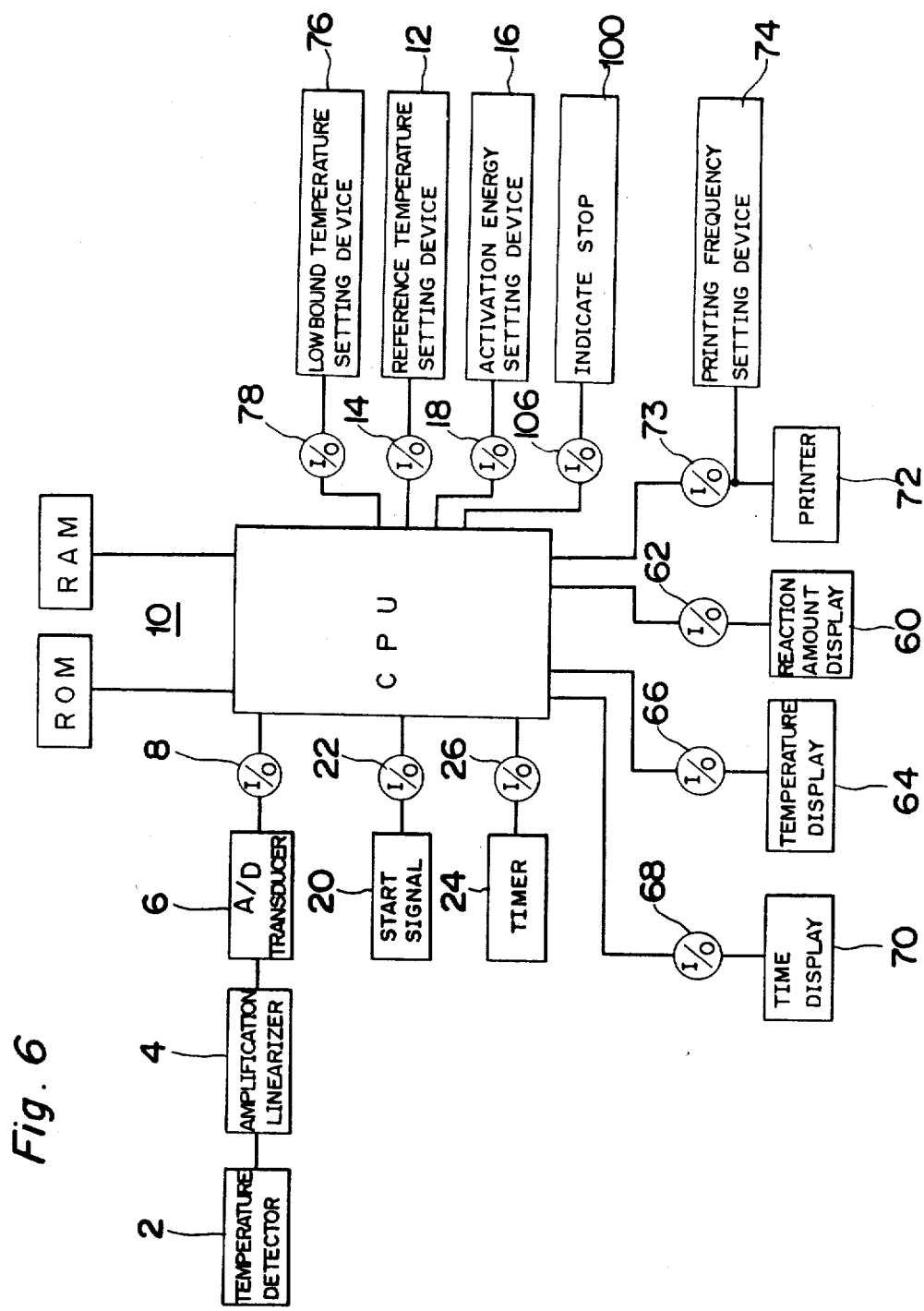
FIG. 6 is a block diagram showing a modification of FIG. 1.

In FIG. 6, there is shown a reaction amount measurement controlling apparatus comprising at least one temperature detector disposed in the interior, at the outer surface of the reaction system or in a container, a computer having an operation function for calculating the reaction amount in accordance with the temperature signal of the temperature detector, and a stop function for terminating the operation function when the temperature signal is lower than the predetermined low bound temperature value.

Figure 7:
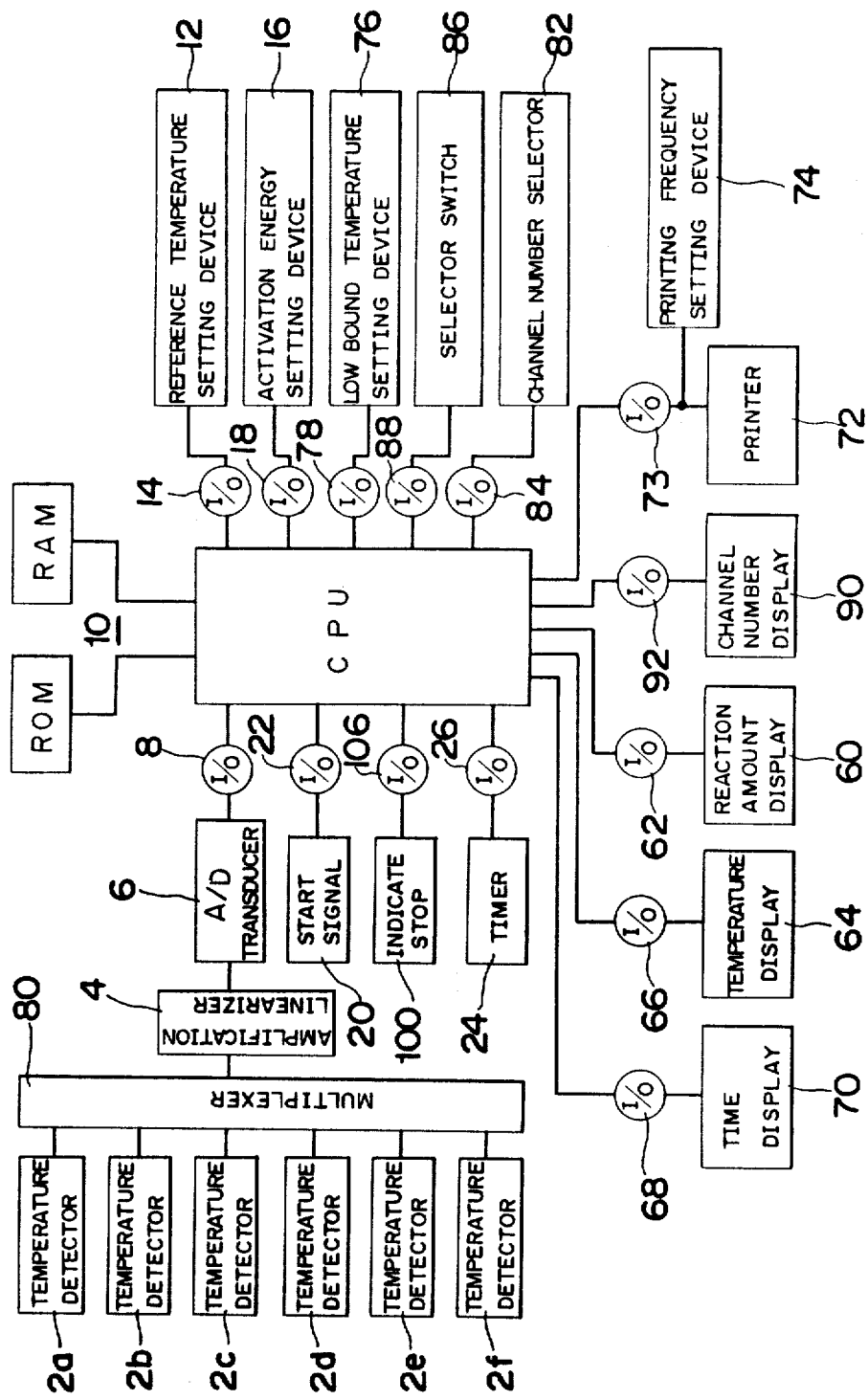
FIG. 7 is a block diagram showing a modification of FIG. 4.

Also, in FIG. 7, there is shown a reaction amount measurement controlling apparatus comprising at least one temperature detector disposed in respective different positions in the interior, at the outer surface of the reaction system or in the vessel, a multiplexer for receiving the temperature signal from the temperature detector, a microcomputer having an operation function for calculating the reaction amount in accordance with the temperature signal from the multiplexer, a stop function for terminating the operation function when the temperature signal is lower than the predetermined low bound temperature value, an average function for obtaining the arithmetic average of each of the reaction amounts, and a selection function for selecting the maximum and minimum among the reaction amounts, and a selection switch for selecting the outputs from the functions of the microcomputer.

The following is the description on the operation of the reaction amount measurement controlling apparatus of the present invention given in connection with a flow chart.

MAIN ROUTINE

Figure 8:
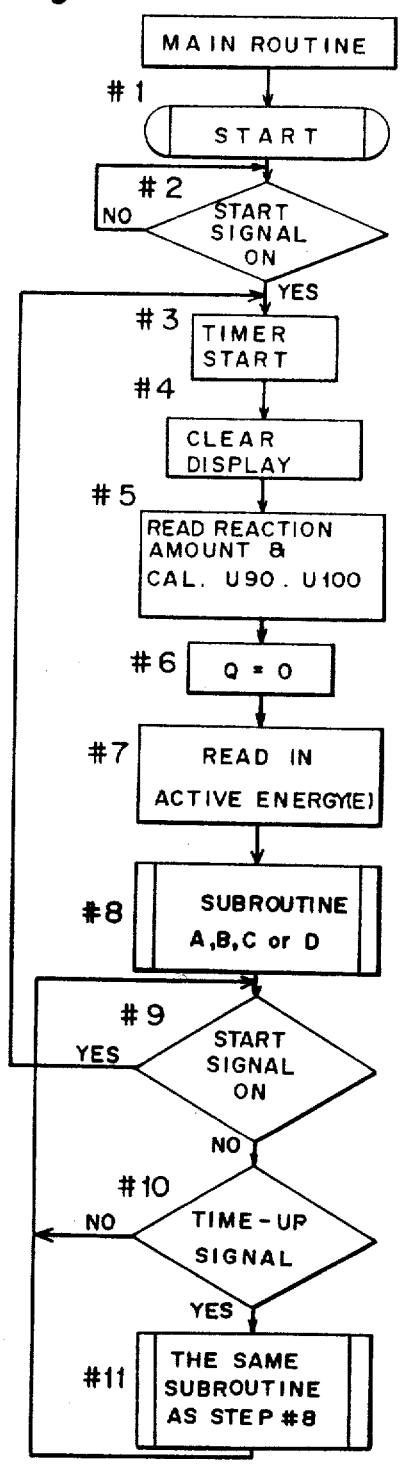
FIG. 8 is a flow chart showing a main routine of an operation carried out by an apparatus of the present invention.

Referring to FIG. 8, a main routine of a flow chart for the control operation carried out in the computer is shown. At step #1, the main switch is turned on to start the computer. At step #2, a start switch is turned on to receive a start signal from element 20 (FIG. 1). At step #3, a timer is turned on to produce a time up signal after every predetermined period of time, such as six seconds. The predetermined period of time is determined by element 24 (FIG. 1). At step #4, the display is cleared so that only zeros are indicated, or nothing is indicated, through displays 60, 64 and 70 (FIG. 1). At step #5, a reaction amount U as set by reaction amount setting device 36 (FIG. 1) is read in, and then, 90% and 100% of the set reaction amount U are calculated, and the results U90 and U100, respectively, are stored in the computer. At step #6, Q, representing the printing frequency, is forcibly set to zero thereby ensuring the data print out in the first cycle of operation in a subroutine. At step #7, activation energy E as set by activation energy setting device 16 is read in. Then, at step #8, a subroutine A, B, C or D is carried out, each of which will be described in detail later in connection with FIGS. 9, 10, 11 and 12, respectively. Step #9 detects whether or not a start signal is present. If the start signal is not present, the program goes to step #10 at which it is detected whether or not a time-up signal is produced.

Since the procedure from step #3 to step #10 is generally very short compared with the time interval between successive two signals set by the timer 24 (FIG. 1), such as six seconds, steps #9—#10—#9—#10 . . . are repeated for a number of times until six seconds pass. When a time-up signal is produced, the program goes to step #11 to carry out a subroutine, which is the same subroutine carried out in step #8. After step #11, steps #9—#10—#9—#10 . . . are repeated again until the next six seconds pass. Then, step #11 is carried out for the second time.

In this manner, the subroutine is carried out may times after each six seconds by repeating step #11, thereby obtaining the reaction amount to the desired amount U90 or U100 for the first work piece. When the reaction for the first work piece is done, that is, when the reaction amount of the first work piece reaches the desired amount, the completed piece is automatically ejected by apparatus 46 or 42 controlled by the subroutine, such as step #A10 or step #A12 in the subroutine A. According to the preferred embodiment, even after the ejection, the subroutine in step #11 is repeated until the next start signal is produced so as to process the next work piece.

SUBROUTINE A (DESIGNED FOR THE EMBODIMENT OF FIG. 1)

Figure 9:
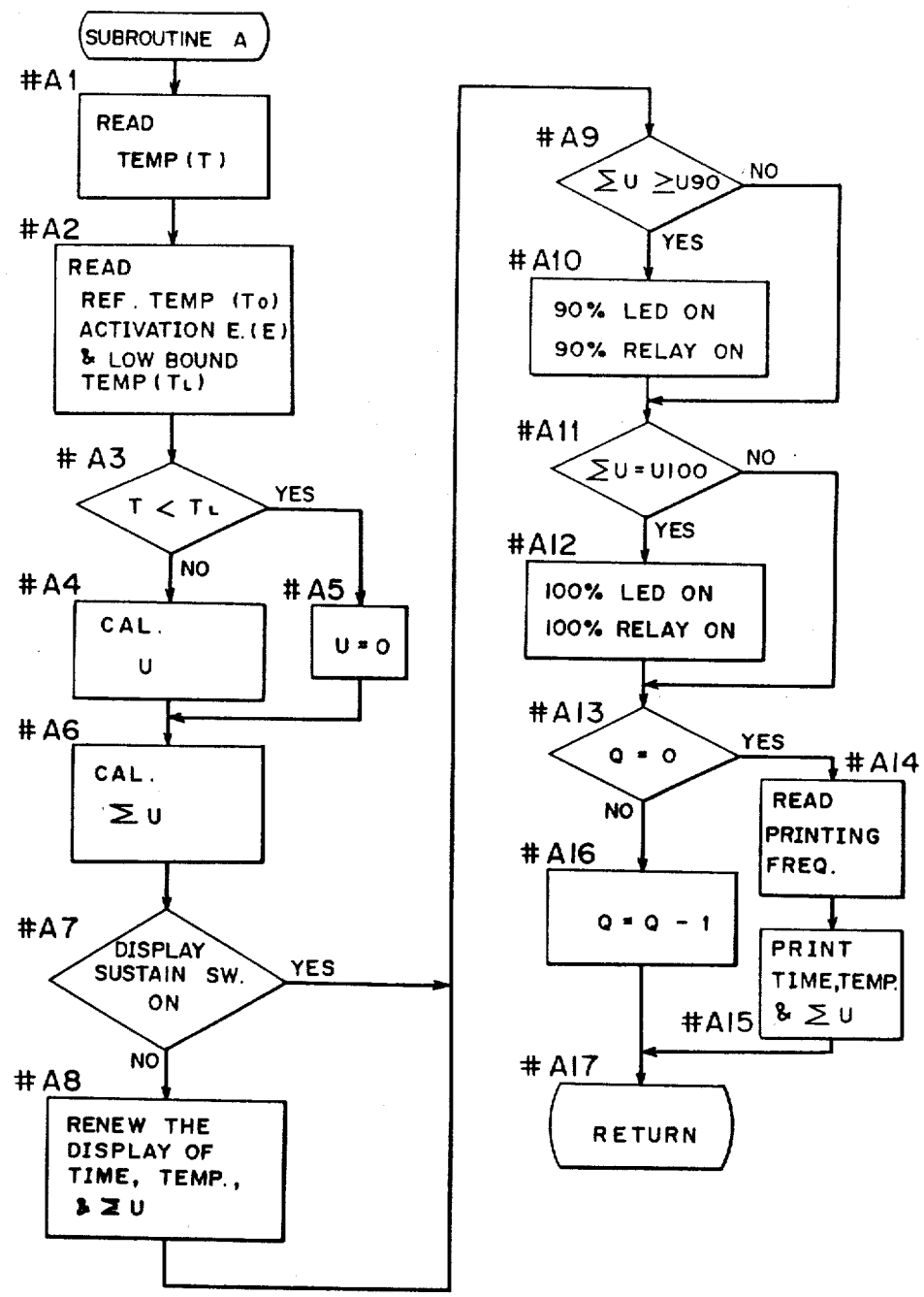
FIGS. 9 to 12 are flow charts showing different subroutines selectively carried out in the main structure of FIG. 8.

Referring to FIG. 9, a subroutine A is shown. At step #A1, the present temperature T is detected and applied to the computer through elements 2, 4, 6 and 8 (FIG. 1). Then at step #A2, a reference temperature To, activation energy E and low bound temperature TL are read from elements 12, 16 and 76, respectively.

Here the low bound temperature TL is a predetermined temperature under which the reaction does not progress. The reaction is so slow that it can be considered that no reaction is effected from the practical viewpoint.

In step #A3, it is detected whether the present temperature T is lower than the low bond temperature TL or not. If not, the program goes to step #A4 to calculate reaction amount progressed in a certain time t, such as six seconds, under the temperature T using an equation:

$$U = e^{-E/R(1/T - 1/To)} \mathsf{x} t$$

wherein
U: equivalence reaction amount
E: active energy
R: gas constant
T: temperature
To: reference temperature
t: time On the contrary, if yes, that is, if the temperature T is lower than TL, the program goes to step #A5 to render that U=0, indicating that no reaction is progressed in that certain time t. In other word, it can be said that the calculation is inhibited.

Then, at step #A6, the result of the calculation is added to the sum of the results of calculations in the previous subroutine cycles, thereby producing a sigma U.

$$\underbrace{\overbrace{\sum_{i=1}^{n} e^{-E/R(1/T - 1/To)} \times t}^{U}}_{\Sigma U}$$

At step #A7, it is detected whether or not a display sustain switch, provided in element 100, is on. If a display sustain switch is on, the program jumps to step #A9, but if not, the program goes to step #A8 to renew the display through elements 70, 64 and 60.

If the display sustain switch is off, the indications on the display are renewed every other six seconds, which is the repeating rate of the subroutine A, so as to continuously change the data on the display. But, such change of the display sometimes makes it difficult to read the data. To facilitate the reading through the display, the operator may actuate element 100 to turn on the sustain switch, thereby maintaining the indications unchanged until the sustain switch is turned off.

At step #A9, it is detected whether or not the sigma U is greater than or equal to U90. If yes, that is, if the reaction amount has reached 90% of the set amount, element 42 actuates such that an LED representing 90% emits light to indicate that the reaction amount has reached 90% of the set amount and/or a relay switch for ejecting the work piece actuates. If no, the program goes to step #A11.

At step #A11, it is detected whether or not the sigma U is equal to U100. If yes, that is, if the reaction amount has reached 100% of the set amount, element 46 actuates such that an LED representing 100% emits light to indicate that the reaction amount has reached 100% of the set amount and/or a relay switch for ejecting the work piece actuates. If no, the program goes to step #A13.

It is to be noted that either element 42 or 46 is made operative before starting the reaction on one work piece.

At step #A13, it is detected whether Q=0, or not. If yes, the program goes to step #A14 to read printing frequency Q from element 74, and then at step #A15, time length from the start of operation, present temperature T, and sigma U are printed by printer 72. Then, the program goes to step #A17. If it is detected that Q≠0, the program goes to step #A16 to subtract 1 from Q, and then, it goes to step #A17. From step #A17, the program returns to the main routine, actually step #9, thereby completing one cycle of operation in the subroutine A.

SUBROUTINE B

Figure 10:
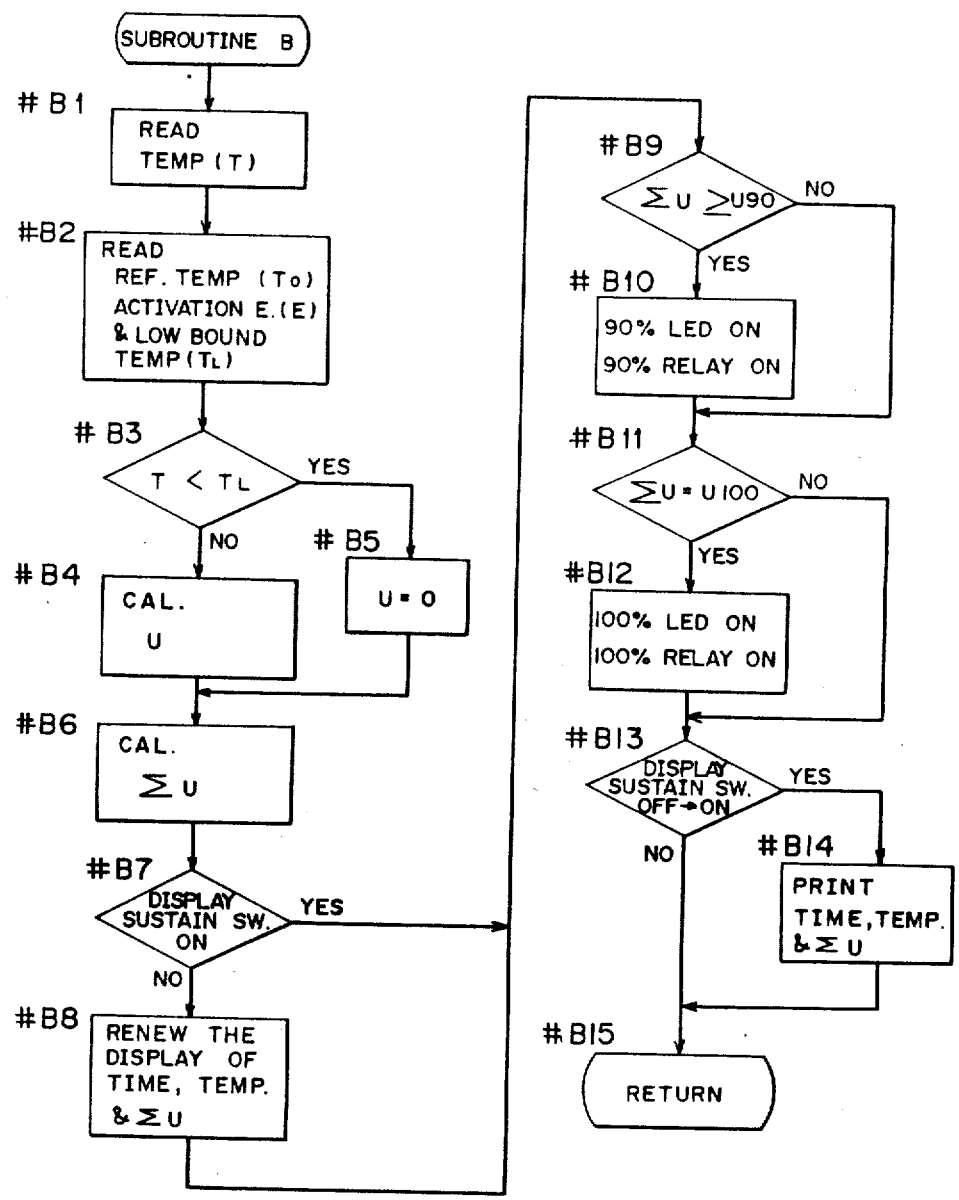

Referring to FIG. 10, a flow chart of subroutine B is shown. The step in subroutine B are the same as the steps in subroutine A except that the procedures in steps

A13–#A16 in subroutine A are changed to different procedures indicted at steps #B13 and #B14.

At step #B13, it is detected whether the sustain switch has changed from off to on within one previous cycle of operation. If yes, the program goes to step #B14 so as to print out time length from the start of operation, present temperature T, and sigma U by printer 72, and then it goes to step #B15. If not, the program directly goes to step #B15 to return to main routine, actually step #9.

SUBROUTINE C (DESIGNED FOR THE EMBODIMENT OF FIG. 4)

Figure 11:
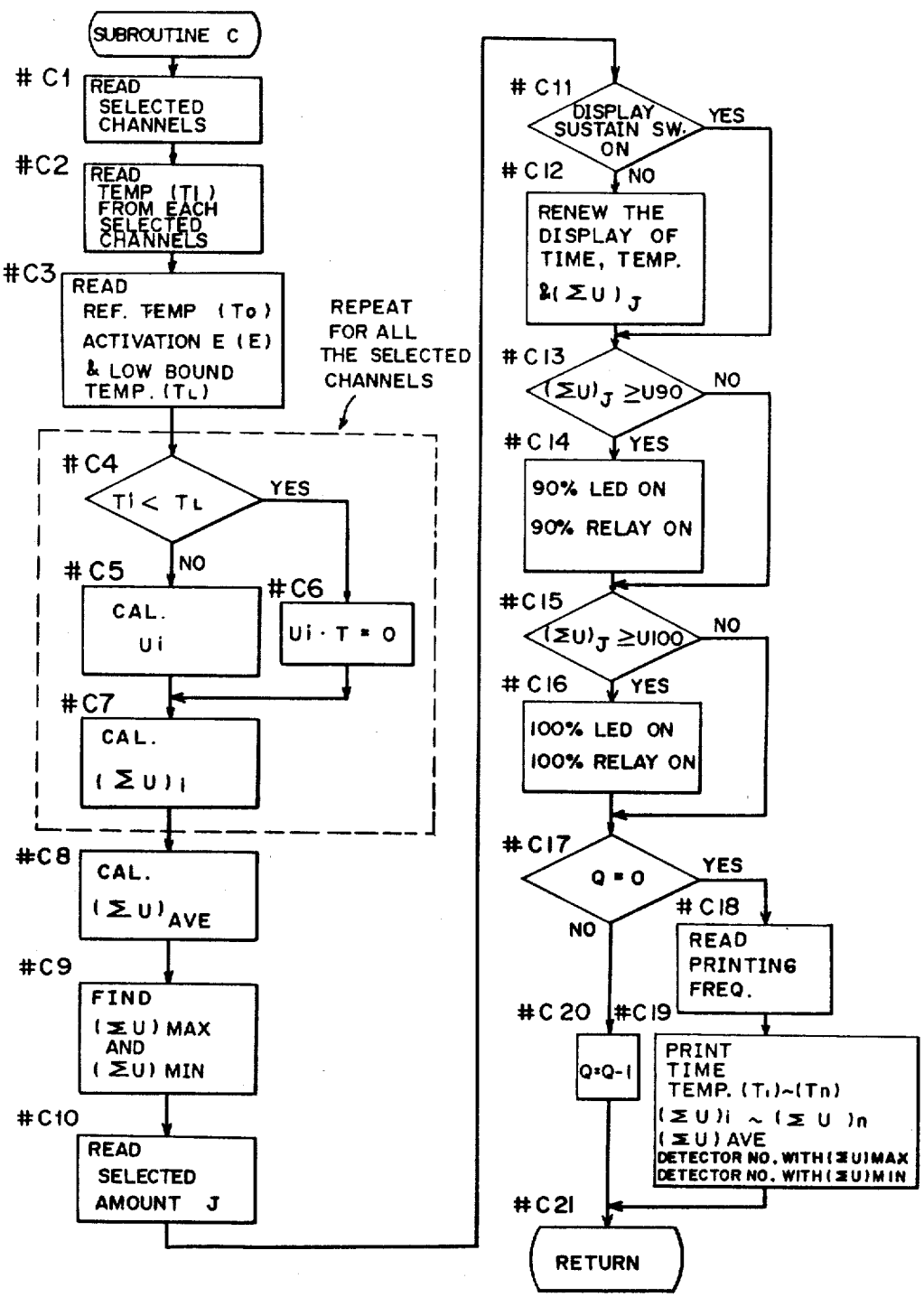

Referring to FIG. 11, a subrouting C is shown. At step #C1, channels nominated by element 82 are detected. According to the embodiment shown in FIG. 4(a), there are six channels which correspond to six different temperature detectors 2a–2f. The operator may select any number of channels. For example, he may select only one channel, such as a channel 2d, or he may select three channels, such as channels 2a, 2c and 2e. Any combination among 2a–2f is possible. For the further description, it is assumed that the operator has selected three channels 2a, 2c and 2e.

At step #C2, temperature T from detectors 2a, 2c and 2e are read sequentially one at a time by the control of multiplexer 80. Then, at step #C3, a reference temperature To, activation energy E and low bound temperature TL are read from elements 12, 16 and 76, respectively.

The following steps #C4–#C7 encircled by a dotted line are carried out repeatedly for three times to calculate three different reaction amounts for three different channels 2a, 2c and 2e. The number of repetition depends on the number of channels selected by element 82.

In steps #C4, it is detected whether the present temperature T from temperature detector 2a is lower than the low bound temperature TL or not. If not, the program goes to step #C5 to calculate reaction amount progressed in a certain time t, such as six seconds, under the temperature T using an equation:

$$U = e^{-E/R(1/T - 1/To)} xt$$

On the contrary, if yes, that is, if the temperature T is lower than TL, the program goes to step #C6 to render that U=0, indicating that no reaction is progressed in that certain time t, thereby inhibiting the calculation in that time t. Then, at step #C7, the result of the calculation is added to the sum of the results of calculations in the previous subroutine cycles, thereby producing a sigma U for channel 2a.

The above steps #C4–#C7 are carried out for channels 2c and 2e.

Then, at step #C8, an average of sigma Us for the three channels is calculated. Next, at step #C9, a channel with a maximum sigma U and a channel with a minimum sigma U are detected. It is assumed that channel 2a has the maximum sigma U and channel 2e has the minimum sigma U.

Next, at step #C10, an amount J selected by selector switch 86 is read. Selector switch 86 can select one amount from different amounts, such as according to the above assumption: sigma U for 2a; sigma U for 2c; sigma U for 2e; average sigma U; maximum sigma U; and minimum sigma U.

At step #C11, it is detected whether or not a display sustain switch is on. If a display sustain switch is on, the program jumps to step #C13, but if not, the program goes to step #C12 to renew the display through elements 70, 64 and 60.

In the following steps #C13–#C16, the same operation as that in steps #A9–#A12 is carried out, provided that data used in the steps #C13–#C16 is the selected amount J.

In the next following steps #C17–#C21, the same operation as that in steps #A13–#A17 is carried out, except that the printer 72 prints more information. According to subroutine C, the printer prints time length from the start of operation, present temperature T for each channel, sigma U for each channel, average sigma U, the channel having the maximum sigma U and the channel having the minimum sigma U.

SUBROUTINE D

Figure 12:
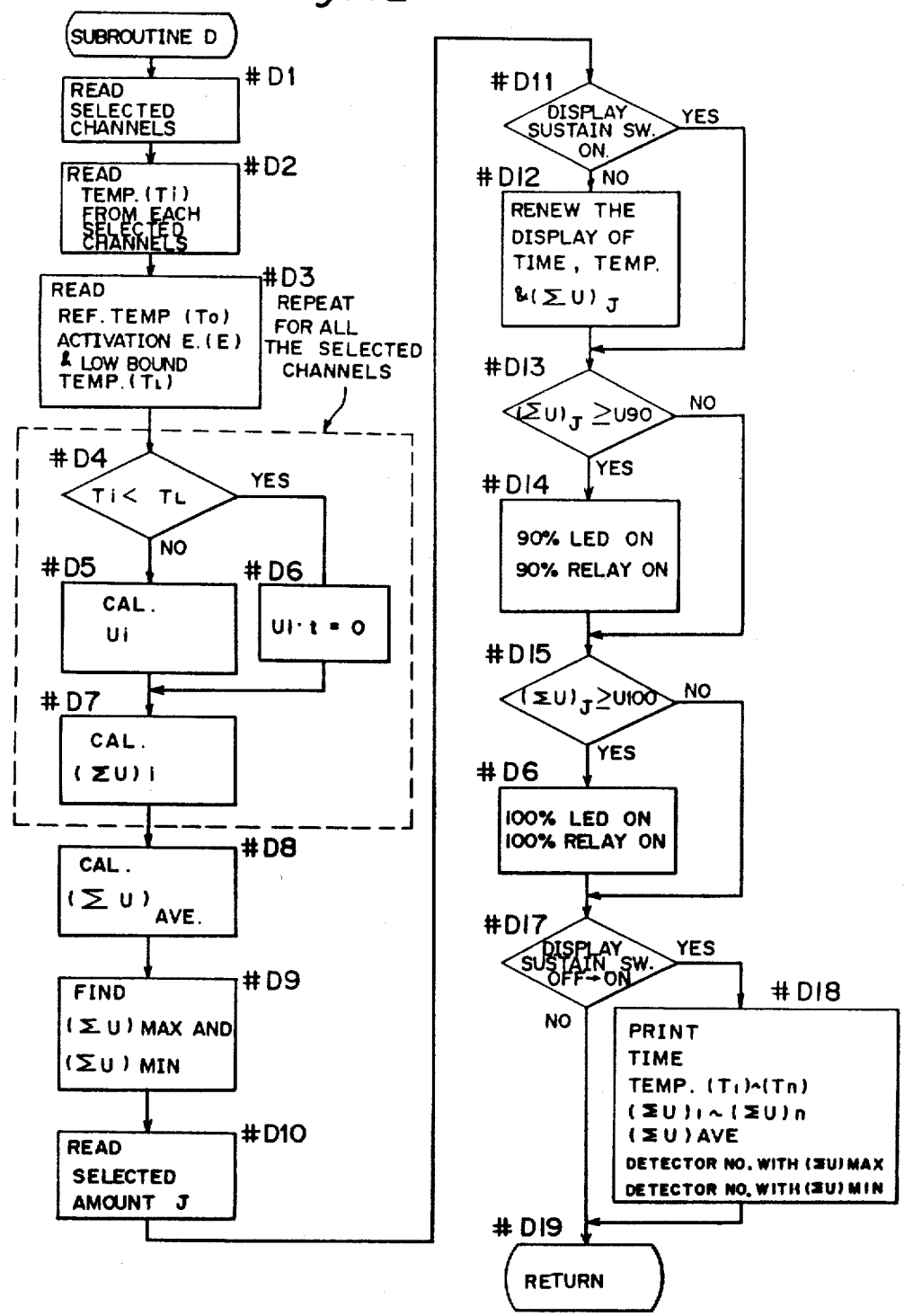

Referring to FIG. 12, a flow chart of subroutine D is shown. The steps in subroutine D are the same as the steps in subroutine C except that steps #C17–#C20 in subroutine C are changed to steps #D17 and #D18.

At step #D17, it is detected whether the sustain switch has changed from off to on within one previous cycle of operation. If yes, the program goes to step #D18 so as to print out the same information as in step #C19 in subroutine C, and then it goes to step #D19. If not, the program directly goes to step #D19 to return the program to step #9.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A reaction amount measuring method for measuring a reaction amount in a reaction system comprising the steps of:

arbitrarily selecting and obtaining a plurality of temperature signals which represent the temperatures at different places in the interior and/or at the outer surface of a reaction system, and/or in a container, for said reaction system;

calculating said reaction amount for each of said different places on the basis of said respective temperature signal obtained from said corresponding place for the purpose of controlling said reaction system based on said respective calculated reaction amount;

arbitrarily selecting and obtaining an average, a maximum value or a minimum value of said reaction amounts from said different places; and inhibiting said calculation of said reaction amount in each of said different places when said temperature signal obtained from said corresponding place is lower than a predetermined low bound temperature.

2. A reaction amount measurement apparatus for measuring reaction amount in a reaction system comprising:

signal selecting means for selecting one or more temperature signals, each corresponding to a temperature of a place of said reaction system;

a computer connected to said signal selecting means for receiving selected temperature signals, said computer having multi-functions of a calculation function for calculating a reaction amount in accordance with said temperature signal, an average-taking function for taking an average of reaction amounts as calculated, a maximum value-taking function for taking a maximum value of reaction amounts as calculated, and a minimum value-taking function for taking a minimum value of reaction amounts as calculated, said computer further comprising means for generating a signal for starting said calculation;

function selecting means for arbitrarily selecting one or more functions from said multi-function computer such that said function selecting means arbitrarily selects said calculation function solely or a combination of calculation function and average-taking function, a combination of calculation and maximum value-taking function, or a combination of a calculation function and minimum value-taking function; and means for controlling said reaction system based on said selected calculated reaction amount.

3. A reaction amount measurement apparatus in accordance with claim 2, said apparatus further comprising a frequency setting means connected to said computer for setting a frequency of sampling the calculated reaction amount, and a printer connected to said computer for printing the calculated reaction amounts which are sampled in a frequency determined by said frequency setting means wherein said computer calculates a reaction amount after each of at least one predetermined time interval.

4. A reaction amount measurement apparatus in accordance with claim 2, wherein said calculation is inhibited when said temperature signal is lower than a predetermined low bound temperature.

5. A reaction amount measurement apparatus for measuring the reaction amount in a reaction system comprising:

a plurality of temperature detectors provided at different places in the interior and/or at the outer surface of a reaction system, and/or in a container of said reaction system, each temperature detector producing a temperature signal;

signal selecting means for selecting one or more signals from said temperature detectors;

a multiplexer for supplying the temperature signals from the detectors to a computer, said computer connected to said signal selecting means for receiving selected temperature signals, said computer having multi-functions of a calculation function for calculating a reaction amount in accordance with said temperature signal, an inhibiting function for inhibiting said calculation when the temperature signal is lower than a predetermined low bound temperature, an average-taking function for taking an average of reaction amounts as calculated, a maximum value-taking function for taking a maximum value of reaction amounts as calculated, and a minimum value-taking function for taking a minimum value of reaction amounts as calculated, said computer further comprising means for generating a signal for starting said calculation;

function selecting means for arbitrarily selecting functions from said multi-function computer such that said function selecting means arbitrarily selects a combination of calculation function, and inhibiting function a combination of calculation function, inhibiting function and average-taking function, a combination of calculation function, inhibiting function or minimum value-taking function or a combination of calclation function, inhibiting function or minimum value-taking function; and means for controlling said reaction system based on said selected calculated reaction amount.

6. A reaction amount measurement apparatus in accordance with claim 5, said apparatus further comprising a frequency setting means connected to said computer for setting a frequency of sampling the calculated reaction amount, and a printer connected to said computer for printing the calculated reaction amount which are sampled in a frequency determined by said frequency setting means wherein said computer calculates a reaction amount after each of at least one predetermined time interval.

7. A reaction amount measuring and controlling method for measuring the reaction amount and for controlling the reaction in a reaction system comprising the steps of:

obtaining a plurality of temperature signals which are representing the temperatures at different places in the interior and/or at the outer surface of a reaction system, and/or in a container of said reaction system;

calculating the reaction amount for each of the different places on the basis of said temperature signal obtained from said respective place for the purpose of controlling said reaction system based on said respective calculated reaction amount;

arbitrarily selecting and obtaining an average, a maximum value or minimum value of the reaction amounts among different places; and generating a terminal signal for terminating the reaction when the obtained reaction amount average, maximum or minimum value reaches or exceeds a predetermined reaction amount.

8. A reaction amount measuring and controlling method in accordance with claim 7, further comprising a step of inhibiting the calculation of said reaction amount at each of the different places when said respective temperature signal obtained from a respective place is lower than a predetermined low bound temperature.

9. A reaction amount measuring and controlling apparatus for measuring the reaction amount and for controlling the reaction in a reaction system comprising:

signal selecting means for selecting one or more temperature signals, each corresponding to a temperature of a place of said reaction system;

setting means for setting a desired reaction amount;

a computer connected to said signal selecting means for receiving selected temperature signals, said computer having multi-functions of a calculation function for calculating a reaction amount in accordance with said temperature signal, and average-taking function for taking an average of reaction amounts as calculated, a maximum value-taking function for taking a maximum value of reaction amounts as calculated, a minimum value-taking function for taking a minimum value of reaction amounts as calculated, and a comparing function for comparing said desired reaction amount with a variant which is any one of the calculated reaction amount, average reaction amount, maximum reaction amount and minimum reaction amount, and for producing a signal when said variant reaches or exceeds said desired reaction amount, said computer further including means for generating a signal for starting said calculation;

function selecting means for arbitrarily selecting functions from said multi-function computer such that said function selecting means arbitrarily selects a combination of calculation function and comparing function, a combination of calculation function, average-taking function and comparing function, a combination of calculation function, maximum value-taking function and comparing function, or a combination of calculation functin, minimum value-taking function and comparing function; and means for controlling said reaction system based on said selected calculated reaction amount.

10. A reaction amount measuring and controlling apparatus in accordance with claim 9, said apparatus further comprising a frequency setting means connected to said computer for setting a frequency of sampling the calculated reaction amount, and a printer connected to said computer for printing the calculated reaction amount, and a printer connected to said computer for printing the calculated reaction amounts which are sampled in a frequency determined by said frequency setting means, wherein said computer calculates a reaction amount after each of a predetermined time interval.

11. A reaction amount measuring and controlling apparatus in accordance with claim 9, wherein said calculation is inhibited when said temperature signal is lower than a predetermined low bound temperature.

12. A reaction amount measuring and controlling apparatus for measuring the reaction amount and for controlling the reaction in a reaction system comprising:

a plurality of temperature detectors provided at different places in the interior and/or the outer surface of a reaction system and/or in a container of said reaction system, each temperature detector producing a temperature signal;

signal selecting means for selecting one or more signals from said temperature detectors;

a multiplexer for supplying the temperature signals from the detector to a computer;

setting means for setting a desired reaction amount;

said computer being connected to said signal selecting means for receiving selected temperature signals, said computer having multi-functions of a calculation function for calculating a reaction amount in accordance with said temperature signal, an average taking function for taking an average of reaction amounts as calculated, a maximum value-taking function for taking a maximum value of reaction amounts as calculated, a minimum value-taking function for taking a minimum value of reaction amounts as calculated, and a comparing function for comparing said desired reaction amount with a variant which is any one of a calculated reaction amount, average reaction amount, a maximum reaction amount and minimum reaction amount, and for producing a signal when said variant reaches or exceeds said desired reaction amount, said computer further including means for generating a signal for starting said calculation;

function selecting means for arbitrarily selecting functions from said multi-function computer such that said function selecting means arbitrarily selects a combination of calculation function and comparing function, a combination calculation functin, average-taking function and comparing function, a combination of calculation function, maximum value-taking function and comparing function, or a combination of calculation function, minimum value-taking function and comparing function; and means for controlling said reaction system based on said calculated reaction amount.

13. A reaction amount measuring and controlling apparatus in accordance with claim 12, said apparatus further comprising a frequency setting means connected to said computer for setting a frequency of sampling the calculated reaction amount, and a printer connected to said computer for printing the calculated reaction amounts which are sampled in a frequency determined by said frequency setting means, wherein said computer calculates a reaction amount after each of at least one predetermined time interval.

14. A reaction amount measuring and controlling apparatus in accordance with claim 12, wherein said calculation is inhibited when said temperature signal is lower than a predetermined low bound temperature.

* * * * *

UNITED STATES PATENT AND TRADEMARK OFFICE
CERTIFICATE OF CORRECTION

PATENT NO. : 4,589,072
DATED : May 13, 1986
INVENTOR(S) : Toshio ARIMATSU

It is certified that error appears in the above—identified patent and that said Letters Patent is hereby corrected as shown below:

<u>Claim 5</u>

Column 14, line 2, change "or minimum" to

-- and maximum --

Signed and Sealed this

Fourteenth Day of June, 1988

Attest:

DONALD J. QUIGG

Attesting Officer

Commissioner of Patents and Trademarks